United States Patent
Tysowski

(10) Patent No.: US 8,989,783 B2
(45) Date of Patent: *Mar. 24, 2015

(54) METHODS, DEVICE AND SYSTEMS FOR ALLOWING MODIFICATION TO A SERVICE BASED ON QUALITY INFORMATION

(71) Applicant: BlackBerry Limited, Waterloo (CA)

(72) Inventor: Piotr Konrad Tysowski, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/180,421

(22) Filed: Feb. 14, 2014

(65) Prior Publication Data

US 2014/0162696 A1    Jun. 12, 2014

Related U.S. Application Data

(63) Continuation of application No. 12/613,723, filed on Nov. 6, 2009, now Pat. No. 8,682,348.

(51) Int. Cl.
*H04W 24/00*   (2009.01)
*H04W 4/02*    (2009.01)
*G01S 5/00*    (2006.01)
*G01S 5/02*    (2010.01)
(Continued)

(52) U.S. Cl.
CPC .. *H04W 4/02* (2013.01); *G01S 5/00* (2013.01); *G01S 5/02* (2013.01); *G01S 19/48* (2013.01); *H04M 1/00* (2013.01); *H04M 1/72572* (2013.01); *H04W 4/001* (2013.01); *H04W 4/025* (2013.01)
USPC ..................................... 455/456.3

(58) Field of Classification Search
USPC ............... 455/456.1–456.6, 414.1, 418–420, 455/412.1–412.2, 457, 566
See application file for complete search history.

(56) References Cited

U.S. PATENT DOCUMENTS 7,151,939 B2   12/2006   Sheynblat
7,898,977 B2   3/2011    Roese et al.
(Continued)

FOREIGN PATENT DOCUMENTS

WO   2008036676   3/2009

OTHER PUBLICATIONS

Read section titled "Google Maps for Mobile" under the Wikipedia link on "Google Maps" (http://en.wikipedia.org/wiki/Google_Maps) (printed on Sep. 10, 2009).

*Primary Examiner* — Brandon Miller

(57) ABSTRACT

The disclosure is directed to a method, computer program product, mobile device allowing for configuring a service accessible via the mobile device. The mobile device is configured to allow a determination of its location data using one or more of a plurality of location techniques. The configuring of the service comprises obtaining quality information including a designation of the location technique used for determining said location data and at least partly a quality of said location data; and integrating said quality information at least partly with said service to allow a modification of said service based on said quality information. Various examples of services enabled or enhanced by this capability are described including camera service, navigation services, data sharing services. Various configurations of computer program products, mobile devices and systems for enabling the services above are also described.

16 Claims, 5 Drawing Sheets

(51) Int. Cl.
*G01S 19/48* (2010.01)
*H04M 1/00* (2006.01)
*H04M 1/725* (2006.01)
*H04W 4/00* (2009.01)

(56) References Cited

U.S. PATENT DOCUMENTS

| | | |
|---|---|---|
| 8,055,272 B1 | 11/2011 | Wilson |
| 8,199,001 B2 | 6/2012 | Verbil |
| 8,311,556 B2 | 11/2012 | Wang et al. |
| 8,682,348 B2 * | 3/2014 | Tysowski .................. 455/456.3 |
| 2008/0268876 A1 | 10/2008 | Gelfand et al. |
| 2009/0005061 A1 | 1/2009 | Ward et al. |
| 2009/0023457 A1 * | 1/2009 | Buer et al. ................. 455/456.1 |
| 2009/0111462 A1 | 4/2009 | Krinsky et al. |
| 2009/0191898 A1 * | 7/2009 | Lewis et al. ............... 455/456.3 |
| 2009/0197600 A1 * | 8/2009 | Lee et al. ...................... 455/434 |
| 2010/0035637 A1 | 2/2010 | Varanasi et al. |
| 2010/0056113 A1 * | 3/2010 | Silverman .................... 455/413 |
| 2010/0255856 A1 * | 10/2010 | Kansal et al. .............. 455/456.1 |

\* cited by examiner

METHODS, DEVICE AND SYSTEMS FOR ALLOWING MODIFICATION TO A SERVICE BASED ON QUALITY INFORMATION

CROSS-REFERENCE TO RELATED APPLICATIONS

This application is a continuation application of U.S. patent application Ser. No. 12/613,723 filed on Nov. 6, 2009. The forgoing application is incorporated by reference herein in its entirety.

TECHNICAL FIELD

The present disclosure relates generally to mobile devices and, in particular, to obtaining quality information comprising at least partly the quality of the location data associated with the mobile device, and utilizing the quality information to modify a service accessible via the mobile device.

BACKGROUND

Mobile devices have been developed which have the capability to identify their own location. These devices may exemplarily use GPS or other technologies. Mobile devices are particularly suited to applications facilitating navigation or location-based applications or services, on account of their portability. Mobile devices may be wireless communication devices such as cellular telephones, handheld PDAs, and the like, which are now capable of supporting features beyond voice or text-based communication between users, such as multimedia features.

Various forms of location-based services are known in the art. Conventional approaches have discussed the use of location data for configuring various location-based services such as navigation services, weather services or the like.

BRIEF DESCRIPTION OF THE DRAWINGS

Features and advantages of the present technology will become apparent from the following detailed description, taken in combination with the appended drawings, in which:

FIG. 2A depicts graphical indicators showing current acquisition lock status (exemplarily cell, Wi-Fi and GPS respectively). FIG. 2B depicts numerical current accuracy indicators (in order of increasing accuracy). FIG. 2C depicts graphical current accuracy indicators (in order of increasing accuracy). FIG. 2D depicts graphical current accuracy indicators (in order of increasing accuracy). FIG. 2E depicts a text description of the precision of a known address. FIG. 2F depicts a countdown for next acquisition.

It will be noted that throughout the appended drawings, like features are identified by like reference numerals.

DETAILED DESCRIPTION

Figure 1:
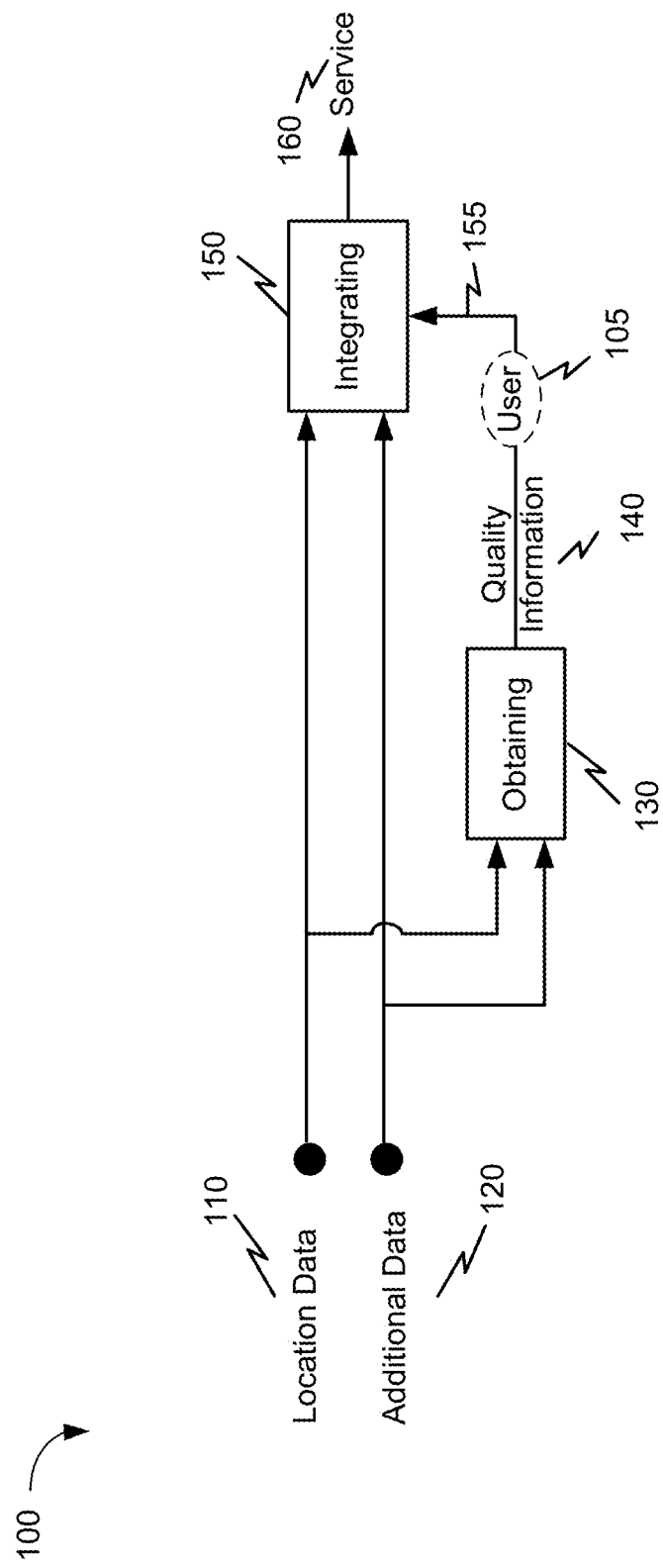
FIG. 1 shows an exemplary flow diagram of the method of the disclosure for modifying a service accessible via a mobile device.

The present technology addresses the foregoing technical problem by providing a method, a mobile device and a computer program product which is capable of obtaining quality information at least partly relating to the quality of the location data of the mobile device, and then at least partly using this quality information to modify one or more parameters of functionality of a service accessible via the mobile device.

Accordingly, an aspect of the present technology is a method of configuring a service accessible via a mobile device, said mobile device configured to allow a determination of its location data using one or more of a plurality of location techniques, said method comprising: obtaining quality information including a designation of the location technique used for determining said location data, said quality information including at least partly a quality of said location data; and integrating said quality information at least partly with said service to allow a modification of said service based on said quality information.

Another aspect of the present technology is a computer program product configured for a service accessible via a mobile device, said mobile device configured to allow a determination of its location data using one or more of a plurality of location techniques, the computer program product comprising code which, when loaded into a memory and executed on an associated processor, is adapted to perform: obtaining quality information including a designation of the location technique used for determining said location data and at least partly a quality of said location data; and integrating said quality information at least partly with said service to allow a modification of said service based on said quality information.

Yet another aspect of the present technology is a mobile device configured to allow a user access to a service, said mobile device comprising: a location identification module configured to determine the location data of said mobile device, using one or more of a plurality of location techniques; a quality provisioning module configured to obtain quality information, said quality information including a designation of the location technique used for determining said location data and at least partly a quality of said location data; and a service access module configured to integrate said quality information at least partly with said service to allow a modification of said service based on said quality information, and configured to allow said user to access said service.

The disclosure is directed to a method, computer program product, and mobile device allowing for configuring a service accessible via the mobile device. Various configurations of computer program products, mobile devices and systems for achieving the above are described.

The mobile device is configured to allow a determination of its location data using one or more of a plurality of location techniques. Quality information including a designation of the location technique used for determining the location data and at least partly a quality of the location data, is obtained. The quality information is integrated at least partly with the service to allow a modification of the service based on the quality information.

Referring to FIG. 1, quality information 140 is obtained 130 from location data 110 and optionally other additional data 120. The quality information 140 is at least partly integrated 150 with the service 160 to allows its modification 155 based on the quality information 140. In embodiments, the quality information 140 may be optionally provided to a user 105 who in turn modifies 155 the service 160 accordingly.

Exemplarily, the service may be a camera-geotagging service which is configured to associate images with location data. The geotagging aspects of the camera-geotagging service may be modified depending on the quality information 140 obtained from the location data 110.

Acts associated with the method described herein can be implemented as coded instructions in a computer program product. In other words, the computer program product is a computer-readable medium upon which software code is recorded to execute the method when the software code is loaded into a memory and executed on an operatively associated microprocessor, exemplarily of the mobile device or a system.

Location Techniques

As noted earlier, the mobile device of the invention may be configured to allow a determination of its location data using one or more of a plurality of location techniques. The term 'location technique' as used herein refers to a technology, a methodology or a combination thereof, for determining the location data for the mobile device.

The location data may be determined based on device-based, network-based or hybrid location techniques. Such systems can collect power and timing measurements, broadcast positioning information and other collateral information for various location methodologies, including but not limited to device-based time-of-arrival (TOA), forward link-trilateration (FLT), Advanced-forward-link-trilateration (AFLT), Enhanced-forward-link-trilateration (E-FLT), Enhanced Observed Difference of Arrival (EOTD), Time Difference of Arrival (TDOA), Observed Time Difference of Arrival (O-TDOA), Global Positioning System (GPS) and Assisted GPS (A-GPS). A worker skilled in the art will readily understand that some location techniques may determine location data based on the arrival times of received signals with respect to a reference time, or may utilize ranging, timing or signal strength (i.e., power) measurements.

Network-based location techniques include those using POA, PDOA, TOA, TDOA, or AOA or combinations of these. Device-based location techniques may include those using TOA, TDOA, POA, PDOA, GPS, or A-GPS. Hybrid location techniques combine multiple network-based location techniques, multiple device-based location techniques, or a combination of network and device based location techniques. Such hybrid location techniques may be designed appropriately to achieve specified accuracy, yield, and latency requirements for the acquisition of the location data.

In embodiments, the mobile device may be configured to allow a determination of its location data using one or more of the following technologies: GPS, cell-tower trilateration, cell-tower triangulation, wireless access points and Internet Protocol (IP) addressing schemes. IP addresses may be used to determine position either when the allocation of IP addresses to Internet Service Providers (ISP's) is known, or the network latency to landmark nodes is observed. Exemplarily, in a notebook environment, IP addresses can be used in trilateration or triangulation approaches utilizing packet latencies.

A worker skilled in the art will readily understand that different location techniques will have differing degrees of location accuracy. For example, GPS-based location techniques typically provide higher accuracy than location techniques based on Wi-Fi access point triangulation or trilateration, which in turn typically provide higher accuracy than location techniques based on cell tower trilateration or cell-tower triangulation. In an embodiment, a GPS-based technique may acquire a location to within five meters, while a location technique based on cell tower trilateration or cell tower triangulation may acquire a location to within a few hundred meters.

The specific location technique used at any given instant may be chosen based on a variety of factors including but not limited to a location latency, a location accuracy, user preferences and battery power consumption. Location latency as used herein may be understood by a worker skilled in the art as at least partly including the time of acquisition for the location data. The location technique employed may be dependent on the service area deployed. In embodiments, the user may manually choose the location technique for location data acquisition. For example, a user may choose to use a GPS-based location technique while being outdoors, and a Wi-Fi access point based location technique while indoors.

In embodiments, the mobile device may be configured in one or more operating modes. Exemplarily, the mobile device may be configured in a 'conserve battery power' operating mode, or in a 'speed up acquisition' operating mode. The mobile device may be configured to automatically choose a location technique based on a current operating mode or an anticipated future operating mode.

Quality Information

Quality information as used herein refers generally to a data set that allows a modification of a service accessible via a mobile device of the disclosure. In embodiments, the integration of the quality information at least partly with the service may serve to enhance the quality of the service accessible via the mobile device.

The quality information may comprise one or more different types of data. In embodiments, the quality information includes a designation of the location technique used for determining the current (exemplarily, the most recently acquired) location data. The quality information further comprises an indication of the quality of the location data (hereinafter referred to as 'location quality').

The location quality may be indicative of one or more aspects of the location data including but not limited to a location accuracy, a location precision, a location availability, a location latency, a location yield, or a combination thereof. Quality information may also be indicative of a velocity accuracy, a time accuracy, a response time, an information update rate, an age of location, dilution of precision (DOP) (exemplarily for GPS-based location techniques) or a combination thereof.

In embodiments, the location quality may include the accuracy of a compass direction. The compass direction may be obtained using a digital compass operatively associated with the mobile device, or using estimation techniques that account for the path being traveled as tracked by a location technique (e.g. a GPS-based location technique).

Location accuracy as used herein may be understood as being indicative of the difference between the location data obtained and the actual position of the mobile device, and may comprise a horizontal location accuracy value and a vertical location accuracy value. As noted earlier, different location techniques typically have differing degrees of location accuracy.

Location precision as used herein may at least partly indicate the differences between a plurality of successive samples of location data. Exemplarily, location precision may be low if the differences in the location data information for successive samples of location data is high, wherein the term 'high' would be readily understood by a worker skilled in the art as being defined having regard to the velocity of the mobile device.

In embodiments, location precision may be indicative of a variance of a plurality of samples of location data obtained. Location precision may also be indicative of other relevant statistical parameters that would be readily known to a worker skilled in the art. The plurality of samples of location data may be previously stored exemplarily in a memory module operatively associated with the mobile device.

Location latency at least partly indicates a time required for acquiring the location data. A worker skilled in the art will readily understand that the location latency is dependant on the location technique used for determination of the location data. For example, GPS-based systems may have a location latency of several minutes, while systems based on cell tower triangulation or cell tower trilateration may have shorter location latencies. When awaiting a location update, it can be beneficial for a user to understand the currently attained level of location accuracy.

Location availability may at least partially indicate whether an acquisition of location data information has been successful. Location yield may at least partially indicate the percentage of a pre-determined or a user-defined number of location data acquisition attempts that have been successful. Location yield may be different depending on whether the mobile device is indoors or outdoors. Exemplarily, a mobile device utilizing GPS-based location techniques while indoors may have unsuccessful acquisition attempts, if there arises difficulties in establishing communication with the GPS satellites.

Quality information may be obtained by processing the location data and additional data. Such additional data may include time data, or various other data (e.g. network information regarding locations of cell towers) that would be readily known to a worker skilled in the art. Previously stored data (e.g. historical samples of location data) may be used to obtain the quality information.

In embodiments, the processing of the quality information may be performed when the mobile device is idle in order to reduce power consumption. In embodiments, quality information associated with one location technique may be used at least partially to predict the quality information for one or more other location techniques.

The processing required for the determination of the quality information may be performed by the mobile device, by a server managed exemplarily by a service and application provider, or by a combination of both. Information required for the processing may at least partly be stored on the mobile device, on the server of the service and application provider, or on a server of a data and content provider communicatively linked with the appropriate processing entities, such as described above. In embodiments, the distribution of the processing burden may be based on the amount of data available for processing and the available communication bandwidth for data transfer between the various processing entities.

The quality information may be updated automatically, or may be updated when requested by the user. The quality information may be obtained periodically or continuously. The update procedure for automatic updates may be chosen by a user and may be distinct for different services. Automatic quality information updates may be obtained on a regular basis with time or based on a change in location data or other data.

In embodiments, a mobile device may be configured to obtain the quality information continuously. A user of the mobile device may either query for the quality information when desired, or may subscribe to updates on the quality information when the quality information changes over time.

In embodiments, the quality information is obtained for each update of the location data. In embodiments, the update rate for the quality information is less than the update rate for the location data. In embodiments, the update rate for the quality information is not fixed, but is dependant on the location data, location technique or other factors. For example, the quality information may be updated if the location data indicates a significant movement. In one embodiment, the quality information may be updated more frequently if the mobile device enters an area where a GPS-based location technique is bounded to be less accurate (e.g. indoors).

In embodiments, the quality information may be delivered to a mobile device using a push-configuration or alternately using a pull-configuration. In the former configuration, the quality information is delivered once it is determined. In the latter configuration, the quality information is determined, delivered or both only when requested (i.e., pulled) by the user.

Modifications to Services Based on Quality Information

A service as described herein may include but is not limited to a camera service, a navigation service, a location-sharing service, a video service, a voice service, a messaging service, a routing service, a mapping service, a weather service, an emergency service, a roadside assistance service, or a combination thereof. Accordingly, the term 'service' is not to be limited to any exemplary services described or mentioned herein.

As noted earlier, the quality information described previously may be integrated with the service to allow for the modification of the service. In embodiments, the modification of the service is based on an input received from a user of the mobile device. Referring to FIG. 1, the modification 155 of the service 160 may be at least partly based on an action of the user 105 based at least partly on the quality information 140. Alternatively, the modification 155 of the service 160 may occur automatically and take into account the quality information 140.

In embodiments wherein the modification is based on an input received from a user, the quality information is at least partly provided to the user via an user interface of the mobile device. The information may be provided to the user either visually (e.g. displayed) or using an audible or tactile signal. In embodiments, The quality information can be displayed at the mobile device, at a monitoring network terminal, or at another mobile device used for monitoring. In embodiments, the display of the quality information to the user may occur prior to the invoking of the service accessible via the mobile device (e.g. camera service).

The user interface of the mobile device may be configured to display the quality information, exemplarily by visually indicating the location technique being used for the location data, and the location quality for the location data obtained. The location quality may be understood by a worker skilled in the art as the quality of the current (e.g., most recently acquired) location data. In embodiments, the location quality may thus at least partially indicate the current accuracy of the location fix. In embodiments and referring to FIGS. 2A to 2F, the quality information or location quality may be at least partly displayed using one or more indicators that differ in symbols used or style.

Figure 2:
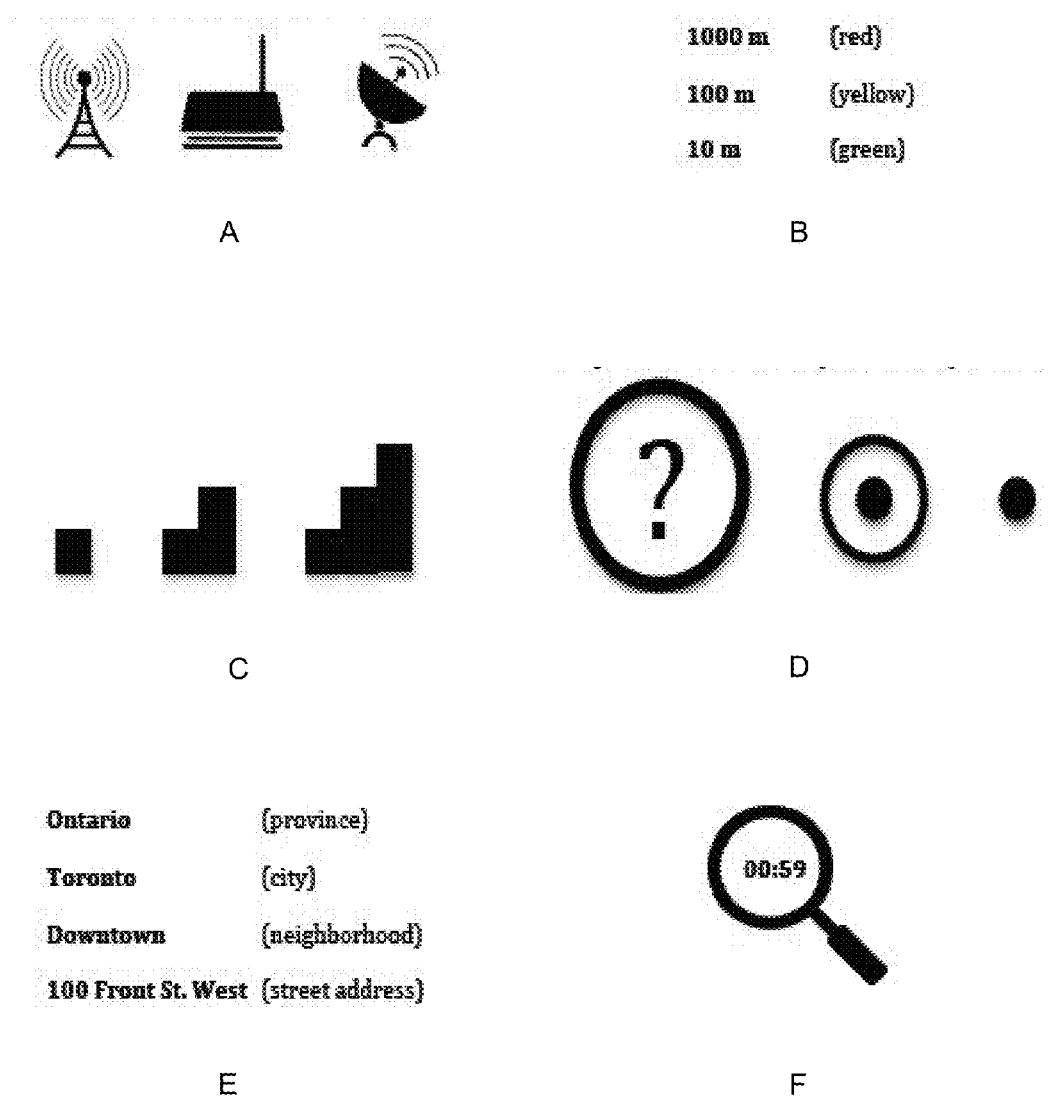
FIG. 2 illustrates various exemplary indicators or symbols that may be utilized by an user interface of the mobile device to display at least part of the quality information.

Different symbols can be used to indicate the location technique being used for location data acquisition. Referring to FIG. 2A, the exemplary graphical indicators therein display that the location technique being used for current location data acquisition is based on cell tower trilateration or cell tower triangulation; wireless access points; or GPS technology respectively.

Different colored indicators may be used to indicate location accuracy. Exemplarily, a green indicator can show a location data acquisition with high location accuracy, while yellow and red indicators denote a location data acquisition with lower location accuracy. In embodiments and referring to FIG. 2B, numerical indicators can be used to indicate a distance amount corresponding to the estimated range of location accuracy based on a confidence interval (e.g. 10 meters vs. 100 meters, with 95% confidence). In embodiments and referring exemplarily to FIGS. 2C and 2D, various graphical indicators can be used to represent the degree of location accuracy. For example, a higher number of bars indicate a better location accuracy in FIG. 2C. The graphical indicators in FIG. 2D are shown in the order of increasing accuracy from left to right respectively.

FIG. 2E shows an exemplary embodiment, wherein a text description of the precision of the known address is displayed. Each component of the address is shown if the location quality permits. For example, the city information may be displayed if the location data is based on cell tower trilateration or cell tower triangulation (typical location accuracy of 5000 meters), but the street address information may be displayed only if the location data is acquired using GPS (typical location accuracy of 10 meters).

FIG. 2F shows an exemplary depiction of the estimated time remaining for completion of the next location data acquisition. A worker skilled in the art will appreciate that an estimated time for completing the next location data acquisition may be different for the various location techniques. In addition, an assessment of the completion times for location data acquisition may be more reliable for certain location techniques. Exemplarily, location techniques based on cell tower trilateration, cell tower triangulation or wireless access points may be more amenable to a reliable prediction of completion time estimate, while prediction of completion times for GPS-based location techniques may depend on the operating environment (e.g. whether the GPS receiver is operating in an assisted mode or a standalone mode) and on the state of the hardware device (e.g. whether ephemeris data is cached on a GPS receiver or not).

The indicators or symbols used for displaying at least part of the quality information may be configured to allow interactions, and thus need not be static in nature. For example, a 'click' on an indicator may result in display of additional parameters relating to the quality information.

A user may choose to initiate an action depending on the current quality information. For example, the age of location data may be used by the user to assess if the location data is too old for the purposes of the service being accessed via the mobile device.

In embodiments wherein the service is a mapping or a navigation service, the user may manually choose the location technique for location data acquisition. For example, the user may opt to be delivered a street address of a point-of-interest (PoI) rather than a map if the quality information is unsatisfactory (i.e., low or poor). Such decisions may be made by the user exemplarily to save time, bandwidth or service costs. Additionally, the types of searches that may be available via a navigation service may be constrained by the location technique being used for obtaining the location data. For instance, while a POI search may be possible with cell tower trilateration or cell tower triangulation, precise driving directions may only be possible with a GPS-based location technique.

The quality information may also be used to enable, disable, or tailor functions. In one embodiment, the quality information includes a location accuracy, and a mapping service may be configured such that the map is appropriately scaled based on the location accuracy.

A user of the mobile device or a network operator may be provided the option to set a minimum value, a maximum value, or both, for various parameters relating to the quality information, location quality or both. Alternatively, pre-set parameters may be automatically assigned. The pre-set parameters may be different for different services. For example, a minimum value for a location accuracy parameter for a road assistance service may be different from a minimum value for a location accuracy parameter for a camera-geotagging service. A worker skilled in the art would similarly appreciate that different services may require different response time, location latency, age of location information etc.

Pre-set parameters may be used in different ways. In embodiments, the pre-set parameters may be used in an automated fashion to modify the service. In embodiments, if the quality information does not satisfy one or more corresponding pre-set parameters, the service may be automatically disabled. In embodiments, the service or the integration of the quality information with the service may be denied if the quality information does not satisfy a quality criterion range. In embodiments, the service may be denied automatically if the quality information does not satisfy the quality criterion range. In embodiments, the service may be configured to be denied if the quality information does not satisfy the quality criterion range with the exception of receiving an override input from the user of the mobile device. A camera-geotagging service may be configured to record and associate location data information with an image only if the location accuracy falls within a pre-set range of distances, exemplarily chosen by a user.

The mobile device may also be configured to signal an alarm to a user via the user interface thereof whenever one or more parameters related to the quality information or location quality or both do not satisfy one or more corresponding pre-set parameters. Such a signal may be a visual signal, an audible signal, a tactile signal, or a combination of the above.

In embodiments, the user interface of the mobile device may be configured to signal a user if the location quality changes (e.g. improves). Exemplarily, a mobile device that has previously acquired location data using cell tower trilateration or cell tower triangulation approaches may be further configured to produce an audible signal when a GPS-based location data acquisition has been completed.

Exemplary Geo-Tagging Services

The mobile device may be configured to obtain various types of data (e.g. audio, video, images, short messages from the user etc), which may be considered in the context of a geo-tagging service as primary data. The primary data may be geo-tagged, i.e., associated with a corresponding location data to form a sample set comprising the primary data and the corresponding location data. The sample set may further comprise additional data (e.g. time data, quality information etc.).

A worker skilled in the art will readily appreciate that the location information that gets encoded with the primary data file (e.g. image) using standard tags may allow for future organization in various applications or websites, for example. Exemplarily, such techniques have been used for organizing image files in iPhoto, Flickr and other services.

In embodiments, the primary data is one or more still pictures or images taken by a stand-alone camera acting as the mobile device or a camera built-in with a mobile device. Alternatively, the primary data is a voice message, a video file, a short message, or the like.

As noted earlier, the quality information may be integrated with the service so as to allow its modification based on the quality information. In embodiments, the quality information is at least partly displayed to a user of the mobile device. The user may choose an action based at least partly on the quality information, thus modifying the service accordingly.

An exemplary scenario is detailed below. The mobile device is configured to determine its location using either a cell tower positioning-based or a GPS-based technology or technique. The cell tower positioning technology may provide a location accuracy sufficient to translate to a city name, but insufficient for further accuracy. However, acquisition of location data using cell tower positioning technology may be faster than a GPS-based acquisition that may provide location data sufficiently accurate to provide a street name and number. A display of the quality information (exemplarily via a user interface of the mobile device) can indicate to a user whether the most recent location data is based on cell tower positioning technology or GPS-based technology. A user may choose to take the picture immediately, when cell tower information is available, or wait longer for a GPS-based data acquisition to be completed.

In embodiments of the camera-geotagging service, the user interface may be configured to indicate when a GPS signal is being acquired, and when the acquisition is done. Additional states may need to be introduced with the use of cell-tower technology. For instance, a first indicator can first appear to signal that the location is currently known through cell towers. A second indicator can appear when finer precision is attained using GPS-based location techniques.

The user interface may be configured to indicate different states even after location data acquisition has been completed. For example, the number of satellites acquired in GPS mode may be shown. Additionally, a worker skilled in the art will appreciate that location quality may change between various samples of location data information utilizing the same location technique. For example, location quality may be different between adjacent fixes using the GPS-based location technique.

The use of different symbols for the different location techniques allow a user to decide whether the location accuracy is sufficient for their purpose. For instance, a user may choose to click the camera shutter once the current city is known so as not to lose the image or shot, or may choose to wait for an exact street address to be calculated in case it's important to recall the exact location of where the picture was taken.

The primary data or the entire sample set may either be stored on the mobile device, or transferred to a server for optionally enabling "an event play-back", or transferred to peer mobile devices communicatively linked therewith. In embodiments, at least part of the data transfer occurs in real-time. A worker skilled in the art would readily understand that transfer of data comprises sending to or receiving data from peer mobile devices or servers communicatively linked with the mobile device.

In embodiments wherein at least a portion of the sample set may be transferred to a central server or peer mobile devices, a user may choose to monitor the quality information to confirm if the data transfer is acceptable. Exemplarily, a user may wish not to share a photograph with others, if the location data corresponding to the photograph is deemed to be too private to reveal. The user may be provided the option to set additional parameters that relate to other attributes such as security and privacy settings.

In addition, the user may be allowed to see the actual location data that is being saved or transmitted on an action (e.g. the current city being sent to a web site) and ensure that information that is deemed too private is not being sent.

One or more indicators used to display at least a part of the quality information to the user may be placed on a global basis on a status bar, or may be displayed along with the service. The indicators may operate consistently on a global basis on a status bar, or may exhibit custom behavior in different service contexts.

In embodiments, the service may comprise a browser application which can be opened on the user interface of the mobile device and used to navigate to a web site associated with a central server. The service may be configured to provide location information to the central server. Standardized location-sharing API such as Google Gears or the W3C Geo-location API may be used for location sharing. A symbol (e.g. a satellite icon) may be used to indicate that location data is being shared with the server or website.

As noted above, different symbols may be used to denote the location technique that was used for acquiring the location data that is being transferred to the server, allowing the user to at least partly be aware of the location quality of the location data being transferred.

Alternately, the actual address being transferred to the server may be shown, which may most commonly be the name of the current city. If permissions allow addresses to be more finely resolved, then the postal code may be displayed, followed by the current street name once the location becomes more finely resolved.

Similar symbols can be used within a mapping or navigation application when searching for the user's current position.

In embodiments, a symbol or an indicator may be associated with the status screen of the browser to indicate the location accuracy of the location data being provided to the website. Typically, the location data is reverse geo-coded and translated to an actual street address (or a portion thereof, such as a postal code) that is utilized to provide additional services (e.g. location-specific content and advertisements).

In embodiments, the method of the disclosure may be configured to allow a user to select one or more quality information parameters (e.g. using a drop-down menu) for the various services. The device may also request the user to set default parameters for at least a few of the services.

In embodiments, the user may set a default parameter for a minimum location quality needed for accessing a geo-tagging service. The location data may not be tagged with the primary data (e.g. a photograph image) within the service if the location quality obtained does not meet the default requirement. The default state can apply to all instances of the user accessing the service, unless it is specifically overridden by the user for a given instance. For example, a user may set the default parameter for a camera-geotagging service to require a street level location accuracy, but may choose to override the parameter to a city level location accuracy while on a tourist trip.

The default parameters for different services accessible via a mobile device may be different. Exemplarily, a user of a mobile device may specify a separate privacy setting for each server that is configured to obtain information from the mobile device. In embodiments, a user may also however specify a global setting for the desired privacy. For example, if the location quality exceeds the global privacy setting (e.g. share only city-level location), then the global setting would override what location information actually gets shared with any communicatively linked server.

In embodiments, the default privacy levels may be different for each server that is linked to the same service. Exemplarily, consider a navigation service. Each POI server operatively associated with the mobile device and used for configuration of the navigation service may obtain a different location quality from the mobile device. One server may require location data with city-level accuracy, while a second server may require location data with street-level accuracy.

A worker skilled in the art would appreciate that the determination of the type of data transferred and the mode of data transfer may depend on the bandwidth capabilities of the communication network infrastructure providing the data transmission capability. Mode of data transfer may be indicative of several aspects of the data transfer including but not limited to a designation of the network technology used (e.g. Wi-Fi™ or Third Generation (3G™)), the data format (e.g. whether compressed or not), the timing of the data transfer (e.g. multiple updates in one packet, or each update sent immediately).

In embodiments, the method of the disclosure may be applied to a racing environment, and the primary data transferred between peer mobile devices may include one or more short data messages or radio messages, such as friendly taunts (exemplarily audio messages) between various race participants. Such transfer of data can allow for simulation of competitive races between users of the peer mobile devices, even if they are separated in time. A user of a mobile device may choose to send a taunt to a competitor only if assured by the received location data and quality information of the competitor that he or she is lagging in the competition.

In embodiments, the functionality of data transfer is integrated with the one or more computer program products configured to achieve the remaining functionalities of the mobile device (e.g. service access), thus obviating the need for a user to access a separate software module (e.g. email) for data transfer.

In embodiments, the mobile device may be configured to allow a user to track the location of one or more friends, exemplarily relative to a map or a route. The data that is transferred between the peer mobile devices may incorporate quality information in addition to the location data. In embodiments, different privacy levels may be set for the location data shared with different friends. Exemplarily, a friend may be depicted using a dot on a specific street, or more generally, as occupying a city. A worker skilled in the art will readily appreciate that social games like "tag" may be built on such systems.

Sharing of Quality Information

In embodiments, the mobile device allows for transfer of data with other peer mobile devices or one or more servers communicatively linked with the mobile device. Exemplarily, this data may include the quality information.

In embodiments, a first part of the quality information data may be transferred in real-time to communicatively linked peer mobile devices, while a second part of the quality information data may be transferred in real-time to a central server. Exemplarily, data relating to location accuracy may be sent to users of peer mobile devices, while data relating to location availability may be sent to a central server to aid in the maintenance of network infrastructure, or for the overall quality control of the service. Alternatively, the quality information is fully transferred to a central server, albeit not in real-time.

In embodiments, the quality information may comprise the location technique being used but also additional information regarding the operational status of the location technique. In one embodiment, the quality information may include information relating to the number of Wi-Fi access points being used for the determination of the location data, or the number of GPS satellites visible. Such information may be used by a service and application provider to modify the infrastructure supporting the service.

In embodiments, the mobile device is a wireless communications device capable of transmitting or receiving information, or both, via a wireless communication medium such as radio, infrared, or the like. The communication capabilities of wireless communications device may include voice communication capabilities, data communication capabilities, or a combination thereof. The term "wireless communications device", for the purposes of this specification, shall include any wireless handheld, smart phone, PDA, tablet, laptop, notebook, netbook, or other communications device that is capable of transmission and reception of data via a wireless communication medium such as radio, infrared or the like.

Appropriate communication protocols and network architectures that support various types of communication would be readily known to a worker skilled in the art. Exemplarily, audio signals may be transferred either in circuit-switched or packet-switched fashion through the communication. The communication signals may be broadcast or multicast. Multicast communications may be valuable if a team leader at a central server is aware of service disruption and wishes to notify the team.

In embodiments, acts associated with the method described herein can be implemented as coded instructions in plural computer program products, each of the computer program products being a computer-readable medium upon which software code is recorded to execute appropriate portions of the method when the software code is loaded into memory and executed on an operatively associated microprocessor.

Figure 3:
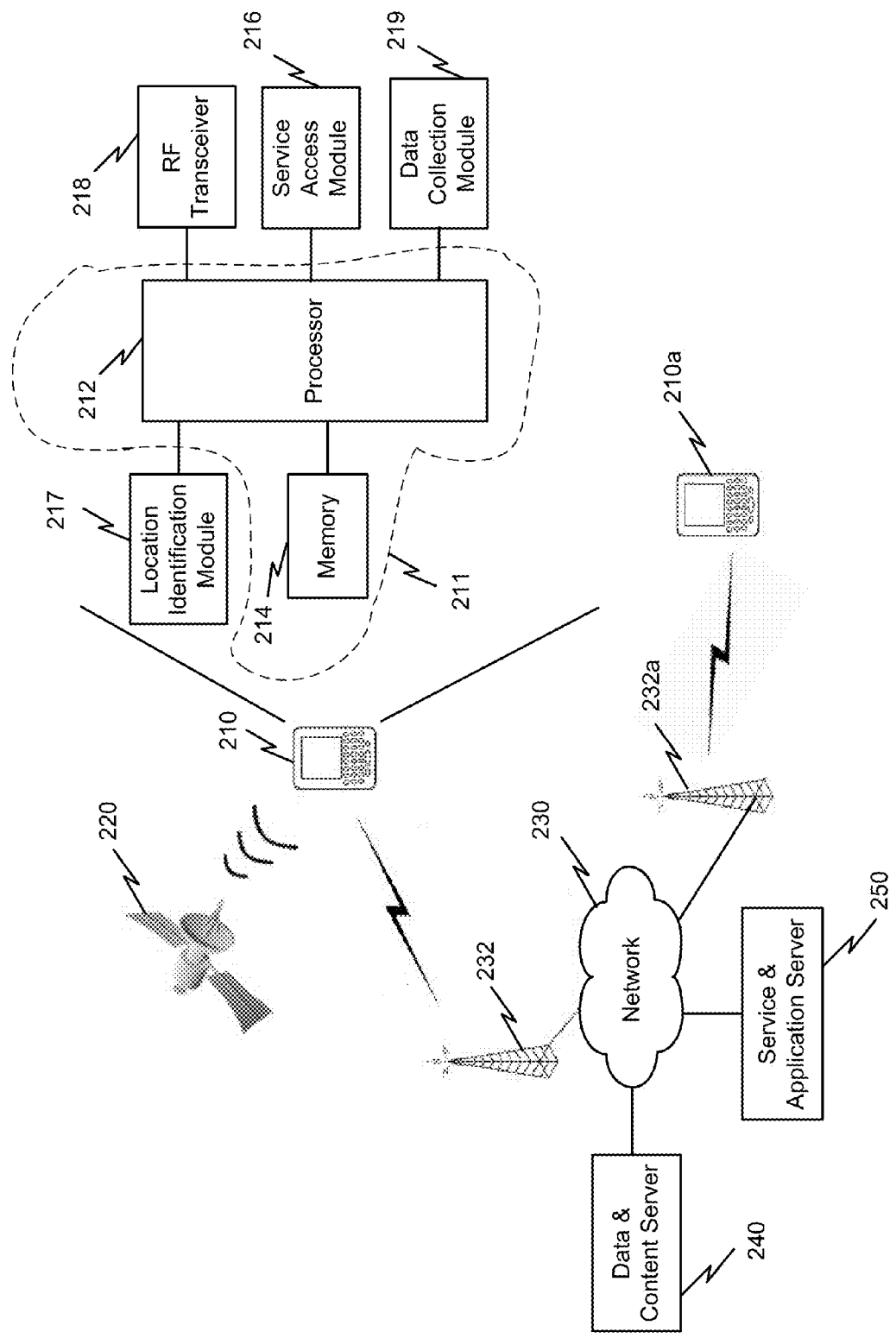
FIG. 3 is a schematic of an exemplary mobile device configured for modifying a service accessible via a mobile device.

Exemplarily referring to FIG. 3, portions of the method may be performed using a first mobile device 210, while portions of the method may be performed using a communicatively linked second mobile device 210a, one or more servers 240, 250, or the like. The communication network 230 facilitates the sharing of information (e.g. location data or quality information data) and any required signalling needed for coordinating the execution of the entire method.

In embodiments, the server may serve to keep track of the current location quality of a user, for the purpose of maintaining presence information that may be shared with peers. Accordingly, the mobile device may be configured to regularly update its quality information with the server.

Mobile Device

The mobile device of the disclosure may be a cellular telephone, a computer terminal having a wireless modem, a personal digital assistant, a stand-alone SPS receiver, a camera, a video camera, a net book, a note book, a lap top, or a receiver capable of receiving signals from ground-based transmitters. Additional types of mobile devices would be readily known to a worker skilled in the art.

The mobile device comprises a location identification module, a quality provisioning module and a service access module. The location identification module is configured to determine the location data of the mobile device and may utilize various location techniques, as discussed previously. The quality provisioning module is configured to obtain quality information, while the service access module is configured to allow a user of the mobile device to access the service. The service access module is configured to integrate the quality information at least partly with the service to allow for the modification of the service using the quality information.

A processing module may be operatively associated with the location identification module, the quality provisioning module and the service access module, and may be configured to coordinate their functions, and to process different types of data using one or more processors. In embodiments, the processing module may be considered to be integrated with the quality provisioning module and the service access module. In embodiments, the processing module is the quality provisioning module. In embodiments, the processing module comprises or is operatively associated with a memory module configured for storage of different types of data. Appropriate processing modules and memory modules would be readily known to a worker skilled in the art.

The service access module allows a user of the mobile device to access the service of interest. A service access module may be designed to handle multiple services. The service access module is configured to integrate the quality information with the service to allow for its modification. In embodiments, the service access module is a user interface.

In embodiments, GPS receivers may be used to determine the location of the mobile device(s). As discussed above, other location techniques may be used to determine the current location to a degree of accuracy commensurate with the technique used. For example, cell tower triangulation, cell tower trilateration or radiolocation techniques can be used to generate the current location for the device. Alternatively, the identity (and location) of the cell tower handling the mobile device's communications can be used as a proxy for the location of the mobile device. Another approach for location identification would be to prompt the user of the device to enter his or her current location (e.g. entering a street address, picking a point of interest (POI) from a map or selecting the current location using crosshairs on a map). As yet another example, Global Navigation Satellite Systems (GNSS) or pseudo-satellite systems other than or in addition to a GPS system may be used. For example, GLONASS, Beidou, COMPASS, Galileo, or like systems may be utilized for determining the location. Satellite-based, regional, or network-based augmentation or improvement systems such as WAAS and A-GPS may also be utilized to aid in determining the location of the mobile device.

In embodiments, the location identification module of the mobile device may be configured to trigger at regular time intervals or at the request of the user, for determination of the location data. In embodiments, the update rate for the quality information and the location data may be different. For example, the location accuracy may be substantially uniform over a service area even if the mobile device changes locations within the service area. In this scenario, the quality information may not be updated even when the location data is constantly updated.

In embodiments, the quality provisioning module may be triggered by the location identification module. For instance, if the location identification module determines that the most current location is significantly far from the previously established location, the quality provisioning module may be invoked to update the quality information.

A worker skilled in the art would appreciate that the algorithms used to compute the quality information will determine the time lag between the obtaining of the location data by the location identification module and the obtaining of the quality information by the quality provisioning module. Appropriate technologies may be chosen to satisfy a predetermined or chosen range for this time lag.

FIG. 3 also shows a block diagram depicting certain main components of an exemplary mobile device 210 with wireless communications capability. It should be understood that this figure is intentionally simplified to show only certain components; the device 210 may include other components beyond those shown in FIG. 3. The device 210 comprises a quality provisioning module 211, which includes a microprocessor 212 (or simply a "processor") and operatively associated memory 214 (in the form of RAM or flash memory or both), to enable a variety of device functions and to execute an operating system for running software applications loaded on the device. The mobile device 210 includes a radiofrequency (RF) transceiver 218 for communicating wirelessly with the base station 232 of a wireless network 230.

The RF transceiver 218 may optionally be alternatively or additionally used for communicating directly with a peer device such as a third party wireless communication device, for example as may occur in some ad-hoc networks. The base station 232 may be a cellular base station, wireless access point, or the like. The base station 232 may vary as the wireless device travels, for example, using well-known hand-off processes in cellular networks. The RF transceiver 218 enables access to a wireless communication channel for transmitting and receiving data. The RF transceiver 218 may further allow for a wireless voice channel for transmitting and receiving voice communications, for example concurrently with transmission and reception of data over the same or a separate logical or physical channel.

Referring to FIG. 3, the mobile device is a wireless communications device 210 operatively associated with a GPS system 220 allowing for determining its location. The mobile device 210 is linked to a cellular network 230 through a base-station 232, and thereby to one or more servers 250 of a service and application provider, and to one or more servers 240 of a data and content provider. Additional mobile devices 210a may be linked to the cellular network 230 using the same base station 232 or a separate base station 232a. The cellular network 230 thus serves for data transfer between peer mobile devices 210, 210a.

The mobile device 210 further comprises a location identification module 217, which is configured to determine the location of the mobile device. In this embodiment, the location identification module 217 includes a GPS receiver chipset for receiving GPS radio signals transmitted from the one or more orbiting GPS satellites 220. The GPS receiver chipset can be embedded within the device or externally connected, such as, for example, a Bluetooth™ GPS puck or dongle. Other systems for determining location may be used in place of GPS, as would be readily understood by a worker skilled in the art.

Referring to FIG. 3 and in accordance with some embodiments, the mobile device also comprises a data collection module 219, which may be configured for collection of other forms of data (e.g. audio, video, images, text for example short messages from the user, monitoring data for example heart rate measurements, etc), which may be associated with the corresponding location data for geo-tagging. In embodiments, the mobile device further comprises a camera, and as such a jogger may take photographs at various locations along the route and associate each photograph with a corresponding sample set, the sample set including but not necessarily limited to the location data. In this embodiment, the one or more data files representative of an event (e.g. a running event) can be created that include various additional forms of data (e.g. photos, audio, video etc).

The service access module 216 comprises one or more input or output devices or user interfaces (UI's), which may include one or more of the following: a display (e.g. a small LCD screen), a thumbwheel, a trackball, a keyboard, touch screen, a keypad, a button, a USB or serial port for connecting to peripheral equipment, a camera, a display, a speaker and a microphone. The display may optionally have touch-screen functionality.

Figure 4:
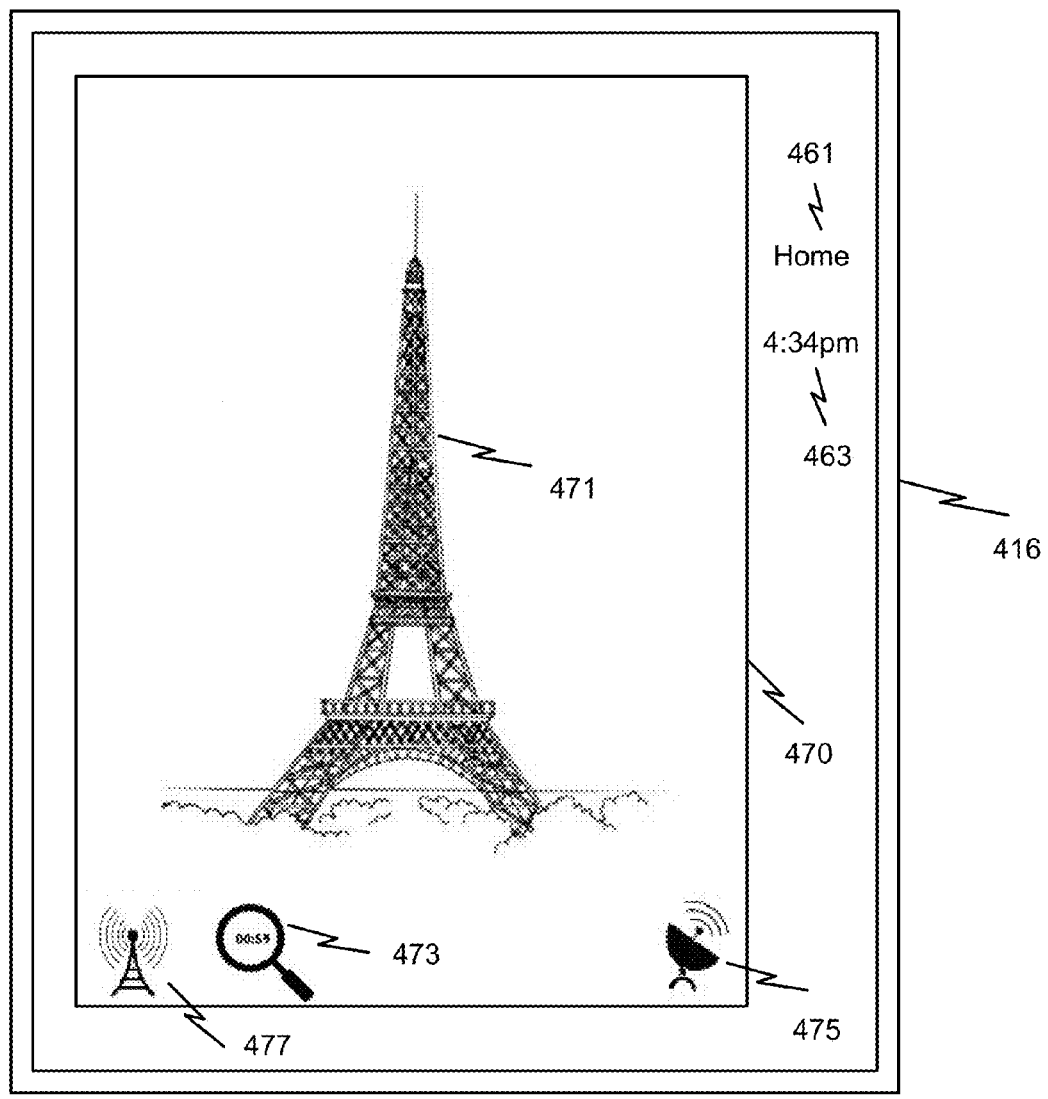
FIG. 4 is an illustration of a user interface of the mobile device accessing a camera-geotagging service, and integrating the quality information therewith.

FIG. 4 illustrates an exemplary user interface 416 configured to allow access to a camera service 470. The camera service 470 is configured to capture a photograph 471 and further to tag the photograph 471 with location data. The user interface is configured to display different aspects of the quality information therewith. Indicator 475 indicates that the data comprising the photograph and associated tag is being transferred exemplarily to a server for archiving. The graphical indicator 477 indicates that the location technique being used for determining the location data is based on cell tower trilateration or cell tower triangulation, while indicator 473 shows the amount of time remaining before a more precise determination of the location data is obtained (e.g. using GPS-based location techniques). The user may also be able to view additional information such as the time 463 and to access a 'home' page via the icon 461. The indicator 473 may also be configured to display the amount of time remaining before the next sample of location data is obtained.

Figure 5:
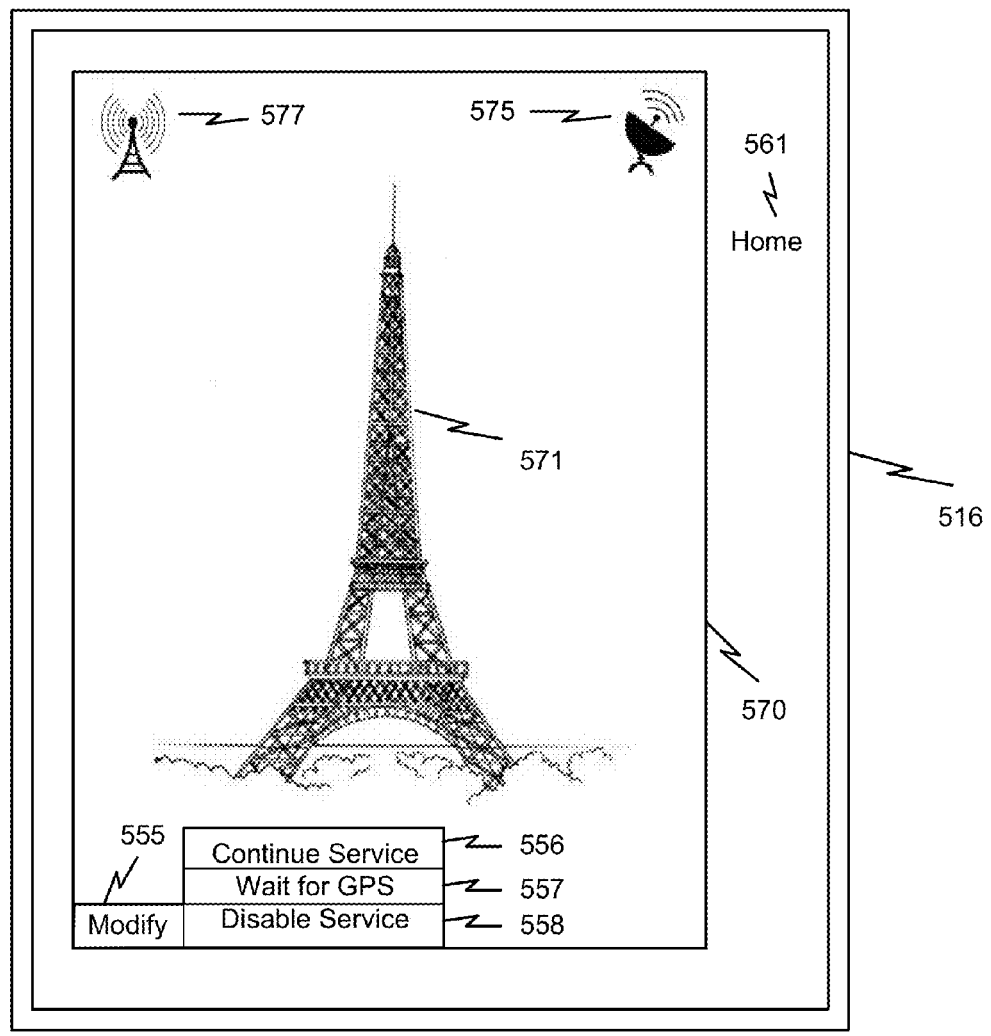
FIG. 5 is an illustration of a user interface of the mobile device accessing a camera-geotagging service, and providing a user of the mobile device the capability to provide an input allowing for the modification of the service.

FIG. 5 illustrates an exemplary user interface 516 configured to allow access to a camera service 570 configured to capture a photograph 571 and to tag the photograph 571 with location data. The user interface is configured to display different aspects of the quality information therewith. Indicator 575 indicates that the data comprising the photograph and associated tag is being transferred exemplarily to a server for archiving. The graphical indicator 577 indicates that the location technique being used for determining the location data is based on cell tower trilateration or cell tower triangulation). The user may also be able to access a 'home' page via the icon 561. The user interface 516 may be further configured to allow a user to provide an input to the mobile device via a 'Modify' menu 555. The input from the user is utilized to modify the camera service 570, thus providing the user the capability to modify the camera service 570 based on the obtained quality information exemplarily displayed by the graphical indicator 577. The 'Modify' menu 555 allows the user to choose one of three possible options: 'Continue Service' 556 configures the camera service 570 to proceed with the available quality information (obtained using cell tower trilateration or cell tower triangulation); 'Wait for GPS' configures the camera service 570 to withhold sharing of the data with the server until an improved quality information is obtained using GPS-based location techniques; and 'Disable Service' configures the camera service 570 to disable the sharing of the data with the server.

The user interface may be configured to signal or alert the user of the mobile device that a portion of the quality information does not meet a quality criterion. Exemplarily, the quality criterion may be satisfied if the quality information satisfies one or more pre-set parameters. In embodiments, the quality criterion is not met if the quality information falls outside a quality criterion range. Such signals may either be visually displayed, or may be an audible signal or a tactile signal (e.g. vibration). In embodiments, an audible signal may be configured to be at a high volume if the quality information misses the quality criterion range significantly and at a low volume if the quality information misses the quality criterion range marginally.

In embodiments, the audible signal conveys the current location accuracy. Exemplarily, the current status may be announced as an audio message such as "Acquiring . . . ", "Found city", "Found address" etc.

The wireless communication device 210 sends and receives communication signals via the RF transceiver 218. When communicating wirelessly with a base station 232 of a wireless network 230, the device 210 may communicate in accordance with one or more appropriate technologies such as: Global Systems for Mobile communications (GSM), General Packet Radio Service (GPRS), Code Division Multiple Access (CDMA) technologies, Wideband CDMA (WCDMA), whether 2G, 3G, High speed packet access (HSPA), Universal Mobile Telecommunication System (UMTS) based technologies, Long Term Evolution (LTE) technologies, Orthogonal Frequency Division Multiplexing (OFDM) technologies, Ultra-Wideband (UWB) technologies, WiFi™ or WiMAX™ technologies, or other communication technologies and protocols as would readily be understood by a worker skilled in the art. In some embodiments, the wireless device 210 may be capable of operation using multiple protocols. The base station 232 may be part of a wireless network, such as a cellular network, local-area network, wide-area network, wireless hotspot network, or the like. The wireless device, base station, network components, and the like, may be configured for data communication, voice communication, or a combination thereof, possibly using additional components, configurations and procedures where appropriate, such as SIM cards, authorization and authentication procedures, handoff procedures, and the like, as would be readily understood by a worker skilled in the art.

This new technology has been described in terms of specific implementations and configurations (and variants thereof) which are intended to be exemplary only. The scope of the exclusive right sought by the applicant is therefore intended to be limited solely by the appended claims.

The invention claimed is:

1. A method of configuring a service accessible via a mobile device, the mobile device configured to allow a determination of location data indicative of a location of the mobile device using one or more of a plurality of location techniques, the method comprising:
   obtaining, by the mobile device, quality information including a designation of a location technique, selected from the plurality of location techniques, used for determining the location data, the quality information including at least partly a quality of the location data, wherein the service is a geotagging service configured to associate the location data with a data file comprising primary data; and
   integrating, by the mobile device, the quality information at least partly with the service to allow a modification of the service based on the quality information,
   wherein the quality information includes a location accuracy, and wherein the modification of the service comprises determining, based at least in part on user input, whether to: associate the location data with the data file immediately, defer association of the location data with the data file pending an improvement in the location accuracy using an alternative location technique belonging to the plurality of location techniques, or cancel association of the location data with the data file,
   wherein the integrating with the service is modified if the quality information is outside of a quality criterion range, the quality criterion range being user-selectable or pre-determined for the service.

2. The method of claim 1, wherein the location technique used for determining the location data is chosen from the plurality of location techniques based on one or more factors selected from the group comprising: location latency, location accuracy, user preferences, battery power consumption, service area, current operating mode, and anticipated future operating mode.

3. The method of claim 1, wherein the quality information is displayed to the user using one or more numerical or graphical indicators.

4. The method of claim 1, wherein the quality information is updated at an update rate which is dependent upon one or more of: the location data, and the location technique used for determining the location data.

5. The method of claim 1, wherein the quality information is indicative of an age of the location data.

6. The method of claim 1, wherein the modification of the service comprises limiting or inhibiting transmission of the location data if the quality information exceeds a privacy setting.

7. The method of claim 1, wherein a first part of the quality information is transferred to one or more peer mobile devices, and a second part of the quality information is transferred to a central server to aid in maintenance of network infrastructure or for overall quality control of the service, said second part of the quality information including information indicative of an operational status of the location technique.

8. A non-transitory computer program product configured for a service accessible via a mobile device, the mobile device configured to allow a determination of location data indicative of a location of the mobile device using one or more of a plurality of location techniques, the computer program product comprising code which, when loaded into a memory and executed on an associated processor, is adapted to cause the associated processor to perform:

obtaining quality information including a designation of a location technique, selected from the plurality of location techniques, used for determining the location data, the quality information including at least partly a quality of the location data, wherein the service is a geotagging service configured to associate the location data with a data file comprising primary data; and integrating the quality information at least partly with the service to allow a modification of the service based on the quality information, wherein the quality information includes a location accuracy, and wherein the modification of the service comprises determining, based at least in part on user input, whether to: associate the location data with the data file immediately, defer association of the location data with the data file pending an improvement in the location accuracy using an alternative location technique belonging to the plurality of location techniques, or cancel association of the location data with the data file, wherein the integrating with the service is modified if the quality information is outside of a quality criterion range, the quality criterion range being user-selectable or pre-determined for the service.

9. A mobile device configured to allow a user access to a service, the mobile device comprising:

a location identification module configured to determine location data indicative of a location of the mobile device, using one or more of a plurality of location techniques;

a quality provisioning module configured to obtain quality information, the quality information including a designation of a location technique, selected from the plurality of location techniques, used for determining the location data; the quality information including at least partly a quality of the location data; wherein the service is a geotagging service configured to associate the location data with a data file comprising primary data; and a service access module configured to integrate the quality information at least partly with the service to allow a modification of the service based on the quality information, and configured to allow the user to access the service, wherein the quality information includes a location accuracy, and wherein the modification of the service comprises determining, based at least in part on user input, whether to: associate the location data with the data file immediately, defer association of the location data with the data file pending an improvement in the location accuracy using an alternative location technique belonging to the plurality of location techniques, or cancel association of the location data with the data file, wherein the integrating with the service is modified if the quality information is outside of a quality criterion range, the quality criterion range being user-selectable or pre-determined for the service.

10. The mobile device of claim 9, further comprising a data collection module configured for collection of data indicative of one or more of an image, text, monitoring data and audio.

11. The mobile device of claim 9, wherein the quality of the location data is indicative of one or more of: a location accuracy, a location precision, a location availability, a location latency, and a location yield.

12. The mobile device of claim 9, further configured to choose the location technique used for determining the location data from the plurality of location techniques based on one or more factors selected from the group comprising: location latency, location accuracy, user preferences, battery power consumption, service area, current operating mode, and anticipated future operating mode.

13. The mobile device of claim 9, wherein the quality information is updated at an update rate which is dependent upon one or more of: the location data, and the location technique used for determining the location data.

14. The mobile device of claim 9, wherein the service access module is further configured to automatically deny the integrating with the service if the quality information is outside of the quality criterion range.

15. The mobile device of claim 9, wherein the quality information is indicative of an age of the location data.

16. The mobile device of claim 9, wherein the service access module is further configured to modify the service at least in part by limiting or inhibiting transmission of the location data if the quality information exceeds a privacy setting.

* * * * *